E. A. MAYOR.
SPRING WASHER FOR PIANO FLANGES.
APPLICATION FILED JULY 30, 1909.
1,010,778.
Patented Dec. 5, 1911.
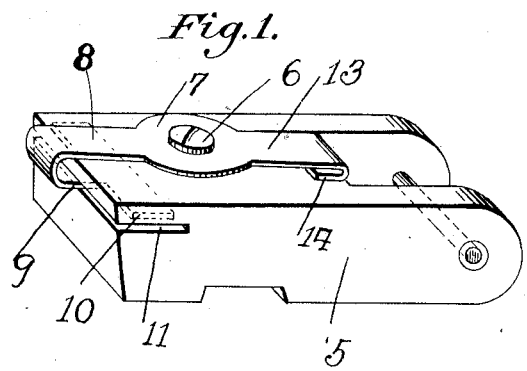
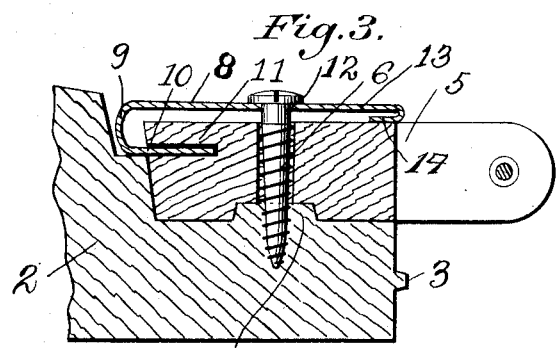
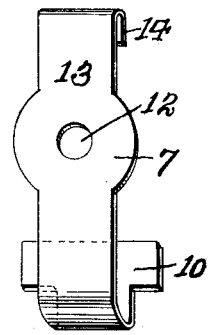
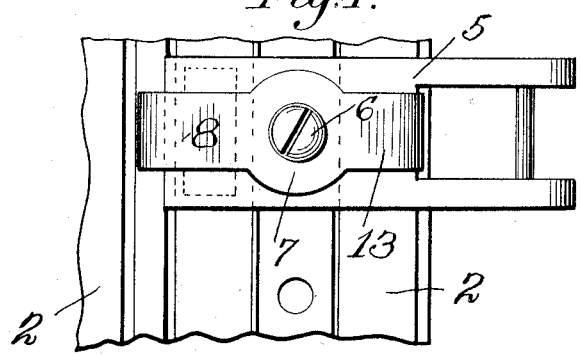
Witnesses:
G. Peacock
G. N. Mayor
Inventor:
Enoch Allan Mayor

# UNITED STATES PATENT OFFICE.

ENOCH ALLAN MAYOR, OF SAN ANTONIO, TEXAS, ASSIGNOR TO THE STAIB-ABENDSCHEIN COMPANY, OF NEW YORK, N. Y., A CORPORATION OF NEW YORK.

SPRING-WASHER FOR PIANO-FLANGES.

1,010,778.  Specification of Letters Patent.  Patented Dec. 5, 1911.

Application filed July 30, 1909.  Serial No. 510,461.

*To all whom it may concern:*

Be it known that I, ENOCH ALLAN MAYOR, a citizen of the United States, and resident of San Antonio, in the county of Bexar and State of Texas, have invented a certain new and useful Spring-Washer for Piano-Flanges, of which the following is a specification.

This invention relates to devices for holding "flanges" to the action rails of pianos.

Wooden flanges in piano actions while preferably, and almost entirely, used in piano construction, are very liable to become loose, twisted or displaced when the action is exposed to extreme dry temperatures, and thus the flange is caused to rattle.

The primary object of my invention is to provide a metallic spring washer of such construction that it will hold the flange securely to the rail and will take up any lost motion in the flange and compensate for shrinkage.

A further object is to provide a device of this character which shall not form a depression in the face of the flange, and which will act as a washer between the head of the flange screw and the flange.

A still further object is to so construct the washer that it will act as a screw holder and prevent the flange screw from falling out of the flange when the flange is being removed from, or mounted on, the action rail. In mounting wooden flanges and taking them out of the action, the flange screw is very liable to fall out, and this annoyance is entirely eliminated by the use of my device which while permitting the removal of the screw from engagement with the action rail, yet holds the screw to the flange.

My invention is shown in the accompanying drawings wherein:

Figure 1 is a perspective view of a piano-action flange with my improved spring washer applied thereto. Fig. 2 is a sectional view through a portion of an action rail and through a hammer-butt flange, my spring washer being also shown in section. Fig. 3 is a face view of a portion of an action rail, and of the flange and washer as shown in Fig. 2. Fig. 4 is a perspective view of the washer detached from the flange.

In the drawings 2 designates an action rail having the rib 3 formed on one face for engagement with a flange. The flange 5 is of the usual construction, is formed of wood and bifurcated at one end as usual for engagement with the part to be pivoted, as for instance the hammer-butt of a piano action. The flange is held in place by means of the flange screw 6, also of the usual form, which passes through the body of the flange 5, through the rib 3 and into the face of the action rail 2. All these parts are as usual.

My improved washer consists of a strip of resilient metal having a relatively enlarged body portion 7 of a width nearly equal to the width of the flange, from which extends a relatively narrow portion 8 which is intended to extend beyond the butt of the flange and is then bent or returned upon itself as at 9 and extended parallel with the portion 8, the terminal end of the strip being laterally expanded as at 10 to a width approximately equal to the width of the butt of the flange. This inwardly bent and widened terminal portion 10 is received within a slot 11 cut transversely across the butt of the flange 5, the end 10 snugly fitting in the slot. It is to be noted that the strip or portion 8 which extends from the body 7 is considerably narrower than the width of the flange 5 and thus permits the insertion of paper or other like material between the butt of the flange and the shoulder upon which it rests. This would not be the case did the portion 8 have a width equal to the portion 10, or in other words equal to the width of the flange.

The body portion 7 of the washer is perforated at its middle as at 12 for the accommodation of the screw 6 which passes relatively loosely through this perforation. Beyond the body portion 7 the washer is extended in a relatively narrow strip 13 whose extremity is bent over upon itself as at 14, this bent over end 14 being adapted to rest against the face of the flange just below the bifurcated portion thereof. While I have shown my washer as formed with this overturned end 14, I do not wish to be limited to this.

In practical use the portion 10 is inserted within the slit 11 and the screw 6 passed through the perforation 12, through the body of the flange and into the action rail. As the screw 6 is turned home the head of the screw engages the body portion 7 of the spring washer and forces it inward. As the body portion of the washer is forced inward the portion 10 will also be forced inward and resiliently hold the flange against the face of the action rail and in firm engagement with the rib 3. The screw 6 may be turned inward to any degree desired, and the body portion 7 will act as a washer giving a bearing surface for the head of the screw and preventing any indentation or marring of the face of the flange 5. Even when the screw has been considerably withdrawn the returned end 10 will resiliently force the flange against the action rail and hold it firmly in place and engaged with the rib 3. With the ordinary construction of this character a comparatively slight outward turn of the screw will loosen the flange so that it will shift and rattle. With my device any loosening of the screw or shrinkage of the wood does not affect the flange as the resilience of the spring washer will force the flange into firm engagement with the action rail. The spring washer takes up all the shrinkage in the wood of the flange so that there is no possibility of the flange rattling or causing any disagreeable noise.

It is to be noted that because of the fact that my improved washer not only extends over the face of the flange, but is also curved over the butt end of the flange and projects into the slot in the flange, it has a length greater than if the washer merely extended over the face of the flange, and hence a strip forming the spring washer may be made relatively thick and strong and thus secure a high degree of resilience, whereas if the washer merely extended over the face of the flange it would have to be made of relatively thin material in order to secure the proper degree of resilience and would be therefore weak.

The perforation 12 in the face of the spring washer has such size relative to the screw 6 that the screw will not easily fall out of or become disengaged from the perforation. The weight of the head of the screw tends to depress it so that it binds within the perforation 12, and even when the flange is turned completely over and faced downward, the screw will bind within the perforation 12, while the washer itself being engaged with the flange prevents the dropping out of the screw. I have found in practice that this is a very important advantage of my device and saves a great deal of trouble and annoyance, either in placing the flange in position or removing it from the action rail.

While I have shown what I believe to be a very effective form of my device, I do not wish to be limited to this as the spring washer may be modified in some respects without departing from the spirit of the invention.

What I claim is:

1. The combination with the flange of a piano action, the solid end of said flange being transversely slotted parallel to the face of the flange, of a spring washer therefor comprising a relatively narrow strip of resilient material, the middle of said strip being enlarged to provide a body portion, the said enlargement being perforated for the passage of a flange screw, one extremity of the strip being returned upon itself and bearing upon the face of the flange, the other extremity of the strip being bent upon itself and extending parallel to the body of the strip and having a relatively wide terminal portion projecting out on each side beyond the body of the strip and spaced therefrom a distance greater than the distance between the first named returned portion and the inner face of the strip, said terminal portion engaging the slot in the flange.

2. The combination with the flange of a piano action, the solid end of said flange being transversely slotted parallel to the face of the flange, of a spring washer therefor comprising a metallic strip, said strip extending beyond the slotted end of the flange and being then returned upon itself and extending parallel to the body of the strip and engaging in said slot, the returned portion of the strip being normally spaced from the body of the strip a distance greater than the distance between the slot in the flange and the face of the flange.

3. The combination with the flange of a piano action, the solid end of said flange being transversely slotted parallel to the face of the flange, of a spring washer therefor comprising a resilient metal strip having a relatively wide portion opposed to the face of the flange and a relatively narrow extension therefrom, said extension projecting beyond the slotted end of the flange and being then bent upon itself and laterally enlarged, said lateral enlargement extending into the slot, and a flange screw passing through the washer and through the flange, the returned portion of the strip being normally spaced from the body of the strip a distance greater than the distance between the slot in the flange and the face of the flange.

4. The combination with the flange of a piano action and a screw passing therethrough, the end of said flange being transversely slotted parallel to the face of the flange, of a spring washer therefor consisting of a strip of metal having a relatively wide body portion opposed to the face of the flange and perforated for the passage of said screw, and a relatively narrow extension from one side of said body portion, said extension being bent upon itself and having a laterally enlarged terminal end of a width approximately equal to the width of the flange and projecting into the slot in the flange, the returned portion of the strip being normally spaced from the body of the strip a distance greater than the distance between the slot in the flange and the face of the flange.

5. The combination with the flange of a piano action, the solid end of said flange being transversely slotted parallel to the face of the flange, of a spring washer therefor comprising a strip of resilient material perforated for the passage of a flange screw, one extremity of the strip being returned upon itself and extending parallel to the body of the strip and projecting into the slot in the flange, and a flange screw passing through the body of the washer and through the flange, the returned extremity of the strip being spaced from the perforated portion of the strip a distance greater than the distance between the slot in the flange and the face of the flange.

Signed at New York city in the county of New York and State of New York this 29th day of July A. D. 1909.

E. ALLAN MAYOR.

Witnesses:
JACOB BECKER,
CHAS. RENNSERF.